United States Patent [19]

Shin et al.

[11] Patent Number: 5,175,012
[45] Date of Patent: Dec. 29, 1992

[54] ANTIOXIDANT EXTRACTED FROM THE DEFATTED RICEBRAN

[75] Inventors: Zae I. Shin, Incheon; Young S. Chang, Seoul; Woo S. Kang, Kyungki; Sung U. Jung, Seoul, all of Rep. of Korea

[73] Assignee: Nong Shim Co., Ltd., Seoul, Rep. of Korea

[21] Appl. No.: 678,590

[22] Filed: Apr. 1, 1991

[30] Foreign Application Priority Data

Apr. 7, 1990 [KR] Rep. of Korea ............ 90-4778

[51] Int. Cl.$^5$ .................................. A23B 7/154
[52] U.S. Cl. .......................... 426/542; 426/430; 426/489
[58] Field of Search ............ 426/429, 430, 489, 541, 426/542

[56] References Cited

U.S. PATENT DOCUMENTS

| | | | |
|---|---|---|---|
| 2,448,729 | 9/1948 | Ozai-Durrani | 426/430 |
| 2,610,914 | 9/1952 | Cassidy | 426/541 |
| 2,829,055 | 4/1958 | Ozai-Durrani | 426/430 |
| 3,261,690 | 7/1966 | Wayne | 426/430 |
| 3,421,902 | 1/1969 | Wayne | 426/430 |
| 3,492,326 | 1/1970 | Barnett | 426/429 |
| 3,852,504 | 12/1974 | Mihara | 426/489 |
| 4,948,619 | 8/1990 | Antrim | 426/542 |
| 4,997,665 | 3/1991 | Grethlein | 426/542 |

FOREIGN PATENT DOCUMENTS

| | | | |
|---|---|---|---|
| 53-118535 | 10/1978 | Japan | 426/429 |
| 58-5147 | 1/1983 | Japan | 426/541 |
| 61-227746 | 10/1986 | Japan | 426/489 |
| 62-241985 | 10/1987 | Japan | |
| 63-291687 | 11/1988 | Japan | 426/541 |

OTHER PUBLICATIONS

Leung, J. et al., "Phenolic Components of Sunflower Flour", J. Food Sci., 46, 1386 (1981).
Takagi, T. et al., "Antioxidant for Fats and Oils from Canary Seed: Sterol and Triterpene Alcohol Esters of Caffeic Acid", J. Am. Oil Soc., 57, 326 (1980).
Naito, S. et al., "Fractionation of Antioxidants from Cacao Bean Husk", J. Jpn. Soc. Food Sci., Technol., 29, 529 (1982).
Hayes, R. E. et al., "Antioxidant Activity of Soybean Flour and Derivatives–A Review", J. Food Sci., 42, 1572 (1977).
Hammerschmidt, P. A. et al., "Phenolic Antioxidants of Dried Soybeans", J. Food Sci., 43, 556 (1978).
Fenton, T. W. et al., "Phenolic Components and Rapeseed Metal", J. Food Sci., 45, 1702 (1980).
Rhee, K. S. et al., "Water-Soluble Antioxidant Activity of Oilseed Protein Derivatives in Model Lipid Peroxidation Systems of Meat", J. Food Sci., 44, 1132 (1979).
S. Arai et al., "Studies on Flavor Components in Soybean. Part II. Phenolic Acids in Defatted Soybean Flour", Agr. Biol. Chem., 30, 364 (1966).
Rhee, K. S. et al., "Antioxidant Activity of Methanolic Extracts of Various Oilseed Protein Ingredients", J. Food Sci., 46, 75 (1981).
D. E. Pratt, "Water Soluble Antioxidant Activity in Soybeans", J. Food Sci., 37, 322 (1972).
D. E. Pratt et al., "Source of Antioxidant Activity of Soybeans and Soy Products", J. Food Sci., 44, 1720 (1979).

Primary Examiner—Carolyn Paden
Attorney, Agent, or Firm—Brumbaugh, Graves, Donohue & Raymond

[57] ABSTRACT

An antioxidant extracted from the defatted ricebran which is obtained by the process comprising the steps of: carrying out the 1st extraction of the defatted ricebran using the mixed solvent of water and ethanol (1:0.8–1.2) at 50°–80° C., obtaining the residue separated from the 1st extracted solution by centrifugation, carrying out the 2nd extraction of the separated residue using the water at 55°–80° C., mixing the 1st extracted solution and 2nd extracted solution, and concentrating the mixed solution.

6 Claims, No Drawings

ANTIOXIDANT EXTRACTED FROM THE DEFATTED RICEBRAN

FIELD OF THE INVENTION

This invention relates to a novel water-soluble antioxidant extracted from the defatted ricebran and a method for improving the preservability thereof.

DESCRIPTION OF THE PRIOR ART

The antioxidants, such as BHA, BHT or tocopherol, have been usually used as the food additives for improving the stability of edible oil and fat products. But, the high cost or the unestablished safety of the antioxidants has sometimes prevented them to be widely used. In other words, the biochemical safety of the synthetic antioxidants has not been completely established, whereas the high cost has been required to obtain the natural antioxidant having high safety.

The antioxidants extracted from the defatted ricebran, which has been obtained as the by-product in the process of making ricebran oil, has been recommended for their safety and low cost because any chemical treatments have not been introduced in the course of preparing it. Oryzanol and phytic acid have been known as the antioxidant components of the ricebran. Oryzanol, an ester of ferulic acid and triterpene alcohol has been lost in the process of extracting the ricebran oil. And phytic acid has showed little antioxidative activity in itself without aids of other antioxidants.

Other antioxidant extracted from ricebran was known by the Japanses Patent laying-open No. 241, 985 in 1987. In this publication, the extraction process for preparing the antioxidant using water as solvent on the following conditions (pH4, Temp.30° C. and for 5 hours) was disclosed. But the antioxidant extracted by this process has showed the slight antioxidative activity and the yields of this antioxidant has not been acceptable in economical respect.

SUMMARY OF THE INVENTION

The purpose of this invention is to provide an antioxidant having excellent activities by the novel extraction process from the defatted ricebran, and a method for improving the preservability of this antioxidant.

The antioxidant according to this invention is believed to be a complex of ferulic acid, phytic acid, polyphenol derivatives and other denatured protein.

We have experimented the activity of extracted antioxidant using mixed solvent of water and ethanol by changing the ratio. By increasing the ethanol portion up to 20% of total mixed solvent, the antioxidant activity of the extracted product shows to be decreasing. But the antioxidant activity of it shows to be increasing over the 20% ethanol portion of mixed solvent. And we have finally found that the peak of activity is shown around the 50% ethanol portion.

The extraction process according to this invention comprises the following steps: 1st step of extraction performed by the mixed solvent of water and ethanol and 2nd step of extraction performed by the pure water solvent from the residue of 1st extraction. And we have found that the much effective antioxidant is obtained by mixing the extracted solution of each steps. And we have also found that the preservability of this antioxidant is explicitly improved by adding the ethanol to be 10% portion of total antioxidant.

DETAILED DESCRIPTION OF THE INVENTION

For the description of the process for obtaining the antioxidant of this invention, let us suppose that the process is composed of 3 steps. And the followings are explained for detailed description of each steps.

1st step

The defatted ricebran which is the residue in the process of ricebran oil production is used as a material and the mixture of 40-60% ethanol in water is used as a solvent The solvent, 4-5 times more than material by weight, is added to the material. And the extraction is carried out by stirring it for 1-2 hours at 50°-60° C.

After centrifugation, the residue is obtained. And the extracted solution is separated.

The antioxidative activity of extracted solution is examined by the changing the mixed ratio of water and ethanol in the solvent. Table 1 shows the variation of the antioxidative activity according to the variation of solvent.

TABLE 1

| Antioxidative activity of the extracted solution, according to the variation of mixed ratio of water and ethanol in the solvent | |
|---|---|
| Ratio of water and ethanol in the solvent | antioxidative activity (min) |
| Water 100% | 514 |
| Water 90% + ethanol 10% | 498 |
| Water 80% + ethanol 20% | 479 |
| Water 75% + ethanol 25% | 530 |
| Water 50% + ethanol 50% | 593 |
| Water 25% + ethanol 75% | 517 |
| Ethanol 100% | 487 |

**The antioxidative activity is measured by the A. O. M test using RanCimat (mode 1617) made by Metrom Co. in Switzerland.

And the yields and antioxidative activity of the extracted solution is also examined by the variation of extraction time, and the result data is shown in Table 2.

TABLE 2

| The yields and antioxidative activity of the extracted solution, according to the variation of extraction time | | |
|---|---|---|
| Extraction time | Yield (%) | Antioxidative activity (min) |
| 1 hr | 7.8 | 575 |
| 2 hrs | 7.8 | 580 |
| 4 hrs | 7.9 | 590 |
| 6 hrs | 8.0 | 590 |
| 8 hrs | 8.0 | 593 |
| 10 hrs | 8.0 | 579 |
| 12 hrs | 8.0 | 588 |

**Yield = Weight of extracted antioxidant/Weight of material (defatted ricebran)

As shown in Table 2, the effective extraction time of this antioxidant is required more than 1 hour, preferably 8 hours. And the Table 3 shows the variation of antioxidative activity, according to the variation of extraction temperature.

TABLE 3

| The antioxidative activity of the extracted solution, according to the variation of extraction temperature. | |
|---|---|
| Extraction temp. (°C.) | Antioxidative activity (min) |
| 70 | 563 |
| 55 | 593 |
| 30 | 531 |

As shown in Table 3, the extraction performed around 55° C. shows the highest antioxidative activity.

And the adjustment of pH for extraction is not required. Accordingly, pH 7-8 of the extracting solution is desirable.

2 nd step

The water, 4-5 times more than residue by weight, is added to the residue obtained from the 1st step. And the extraction is carried out by stirring it for 2-3 hours at 55°-80° C. After centrifugation, the residue obtained, and the extracted solution is separated by the difference of density. The preferred extraction time for this step is around 2-3 hours, in consideration of the output and antioxidative activity of the extracted product.

3 rd step

The extracted solution obtained from 1st step and 2nd steps are concentrated respectively. And the degree of concentration in conducted at the range of 5-40% water content to meet the numerous usage.

In case of the low water content, the viscosity of the antioxidant is high and the stability for storage is preferable, whereas the viscosity of it is low in the high water content. The concentrated solution of each step is mixed. And as shown in Table 4, the mixed solution of this step shows better antioxidative activity than each extracted solution.

TABLE 4

The comparision of antioxidative activity among the extracted solution in each step

| Step | Antioxidative activity (min) |
| --- | --- |
| 1st step | 593 |
| 2nd step | 502 |
| 3rd step | 605 |

The antioxidant obtained from this 3rd step is useful for the storage of oil and fat product. In case of the Palm oil, the suitable concentration of this antioxidant is about 100 ppm, because the increase of the concentration more than 100 ppm does not bring the better antioxidative activity.

Table 5 shows the antioxidative activity of this invention compared with other generally used antioxidant, such as tocopherol and BHT.

TABLE 5

The comparision of antioxidative activity

| Antioxidant | Concentration (ppm) | Antioxidative activity (min) |
| --- | --- | --- |
| Antioxidant of this invention | 100 | 605 |
| Antioxidant extracted from ricebran using only water solvent | 100 | 514 |
| Antioxidant extracted from ricebran using only water solvent | 200 | 588 |
| Tocopherol* | 100 | 445 |
| Tocopherol** | 200 | 504 |
| BHT* | 100 | 439 |
| BHT** | 200 | 448 |

*Made by Henkel in U.S.A.
**Made by Sigma chem in U.S.A.

As shown in Table 5, the antioxidant of this invention shows high effective antioxidative activity compared with a conventional antioxidants. And the other merits of this antioxidant lies in the low cost and high safety of it. This antioxidant can be produced in low cost, because the cheap ricebran is used as a raw material. And the safety of this antioxidant is completely established, as this invention does not include any chemical treatment from the natural resource. For the better preservability of this antioxidant, ethanol is added to the antioxidant. If this antioxidant is fully concentrated below 5% water content, the stability and preservability of it can be maintained without adding the ethanol. But in case of more than 5% water content, the stability and preservability of it can not be maintained without adding the ethanol. But in case of more than 5% water content, the adding 1-10% ethanol by weight is preferred.

The present invention is explained in more detail with reference to the following examples, which are only illustrative but not limitation for the scope of the present invention.

EXAMPLE 1

500 ml of mixed solvent of water and ethanol (5:5) was added to the 100 g of defatted ricebran. The 1st extraction was carried out at 50°-60° C. for 1 hour. And the 1st extracted solution was seperated from the residue by contrifugation. 400 ml of water was added to the residue and the 2nd extraction was carried out at 60°-65° C. for 2 hours. After centrifuging it, the 2nd extracted solution was seperated from the residue. The 1st extracted solution was mixed with the 2nd extracted solution, and the mixed solution was concentrated to 5% water content. Finally 7.8 g of concentrated solution was obtained.

EXAMPLE 2

800 ml of mixed solvent of water and ethanol (5:5) was added to the 200 g of defatted ricebran. The 1st extraction was carried out at 50°-60° C. for 1 hour and 30 mins. And the 1st extracted solution was seperated from the residue by centrifugation. The extracted solution was concentrated to 10% water content. The concentrated solution was centrifuged again, and the residue was seperated. 600 mg of water was added to the residue, and the 2nd extraction was carried out at 55°-60° C. for 3 hours. The 2nd extracted solution was also concentrated to 10% water content. The 1st concentrated solution and 2nd concentrated solution were mixed, and finally 8.0 g of concentrated solution was obtained.

EXAMPLE 3

800 ml of mixed solvent of water and ethanol (5:5) was added to the 200 g of defatted ricebran. The 1st extraction was cirried out at 55°-60° C. for 1 hour and 30 mins. And the 1st extracted solution was seperated from the residue by contrifugation. 600 ml of water was added to the residue and the 2nd extraction was carried out at 60°-65° C. for 3 hours. After centrifuging it, the 2nd extracted solution was seperated from the residue. The 1st extracted solution was mixed with the 2nd extracted solution, and the mixed solution was concentrated to 37% water content. And then 1.5 g of ethanol was added. Finally, 39 g of concentrated solution was obtained.

We claim:

1. An antioxidant extracted from defatted ricebran which is obtained by the process comprising the steps of:

a) performing a first extraction of the defatted ricebran by contacting a solvent of 40-60% ethanol in water with the defatted ricebran for 1-12 hours at 50°-80° C. to obtain a first extracted solution, wherein the weight ratio of the solvent: ricebran is in the range of 4-5:1, b) separating a residue from the first extracted solution by centrifugation,
c) performing a second extraction of the separated residue by contacting the residue with water for 2-3 hours at 50°-80° wherein the weight ratio of water: residue is 4-5:1, to obtain a second extracted solution,
d) mixing the first extracted solution and second extracted solution,
e) concentrating the mixed solution to a range of 40-50% water content, and
f) adding ethanol to the antioxidant produced in (e) in the weight ratio of 1-10% of total solution to enhance preservability of the antioxidant.

2. The antioxidant according to claim 1, wherein the duration of the first extraction step is about 1-6 hours.

3. The antioxidant according to claim 1, wherein the duration of the first extraction step is about 1-8 hours.

4. An antioxidant extracted from defatted ricebran which is obtained by the process comprising the steps of:
a) performing a first extraction of the defatted ricebran by contacting a solvent of 40-60% ethanol in water with the defatted ricebran for 1-12 hours at 50°-80° C. to obtain a first extracted solution, wherein the weight ratio of the solvent: ricebran is in the range of 4-5:1,
b) separating a residue from the first extracted solution by centrifugation,
c) performing a second extraction of the separated residue by contacting the residue with water for 2-3 hours at 50°-80° C. wherein the weight ratio of water: residue is 4-5:1, to obtain a second extracted solution,
d) concentrating the first extracted solution and second extracted solution to a range of 5-40% water content respectively,
e) mixing the concentrated first and second extracted solutions, and
f) wherein ethanol is added to the antioxidant produced in the weight ratio of 1-10% of total solution to enhance preservability of the antioxidant.

5. The antioxidant according to claim 4, wherein the duration of the first extraction step is about 1-6 hours.

6. The antioxidant according to claim 4, wherein the duration of the first extraction step is about 1-8 hours.

* * * * *